(12) United States Patent
Logan et al.

(10) Patent No.: US 6,561,574 B1
(45) Date of Patent: May 13, 2003

(54) CROSS MEMBER SUPPORT

(75) Inventors: Dan T. Logan, Freemont, IN (US); Walter J. Matt, Clinton, TN (US); Steven E. Yates, Ft. Wayne, IN (US); Wallace B. Morehouse, Clinton, TN (US)

(73) Assignee: DWWS, LLC, Fort Wayne, IN (US)

( * ) Notice: Subject to any disclaimer, the term of this patent is extended or adjusted under 35 U.S.C. 154(b) by 0 days.

(21) Appl. No.: 10/092,196

(22) Filed: Mar. 6, 2002

(51) Int. Cl.$^7$ .................................................. E04C 3/30
(52) U.S. Cl. ....................................... 296/204; 296/196
(58) Field of Search ................................ 296/204, 196, 296/182, 183; 52/729.1

(56) References Cited

U.S. PATENT DOCUMENTS

| | | | | |
|---|---|---|---|---|
| 1,360,720 A | * | 11/1920 | Brown et al. ............... | 52/731.7 |
| 5,285,616 A | * | 2/1994 | Tripp ......................... | 52/729.1 |
| 5,553,437 A | * | 9/1996 | Navon ........................ | 52/729.1 |
| 6,330,778 B1 | * | 12/2001 | Jakobsson ................... | 296/204 |
| 6,434,907 B1 | * | 8/2002 | Simboli ...................... | 296/204 |

FOREIGN PATENT DOCUMENTS

| JP | 4-212678 | * | 8/1992 | ................. 296/204 |
|---|---|---|---|---|

* cited by examiner

*Primary Examiner*—D. Glenn Dayoan
*Assistant Examiner*—H. Gutman
(74) *Attorney, Agent, or Firm*—Pitts and Brittian, P.C.

(57) ABSTRACT

A cross member is provided for mounting between a first channeled beam and an opposed second channeled beam located in a fixed position relative to the first channeled beam. The cross member comprises two substantially similar elongated side members. Each of the side members includes a secured end wall and an opposed mating end wall. The secured end wall defines apertures adapted to align with apertures defined in one of the channeled beams. The mating end wall defines a surface that defines an acute angle with respect to the longitudinal axis of the side member.

4 Claims, 5 Drawing Sheets

CROSS MEMBER SUPPORT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The present invention relates generally to the field of truck tractors and more particularly to a cross member for supporting a cab on a rigid frame of a truck tractor.

2. Description of the Related Art

In the construction of truck tractors, a standard rigid frame is assembled with pre-determination of the specific cab that will be installed on the frame. These pre-assembled frames generally include two parallel, longitudinal beams that are secured in fixed positions relative to one another. The beams are generally C-shaped in cross-section, with the open sides of the beams opposing one another. A cab and peripheral equipment are then selected for mounting upon the frame. Different cabs and equipment have different requirements as to the location of the cross member supports. Accordingly, cross member supports are installed on truck tractor frames during the assembly process.

As noted above, the longitudinal beams are generally C-shaped in cross-section to provide rigidity and to provide a planar top surface for attaching the cab and equipment. However, the planar top surface and planar bottom surface of the longitudinal beams prevent the insertion of cross member support having a length approximately equal to the distance between the parallel side walls of the beams. The width of the cross member prevents the cross member from being rotated into position or removed after placement between the C-shaped beams. Various efforts have been made to provide cross-member supports for addition to a truck tractor frame. Generally, however, they have required several different parts with multiple connections, each of which can reduce the rigidity of the overall cross member. Moreover, the locations of connection can be located in areas that are difficult to reach, especially with tools.

It is generally desirable to provide a cross-member that uses a minimal number and types of parts and requires the fewest connections to the frame in order to maintain the cross member as rigid as possible relative to the frame.

SUMMARY OF THE INVENTION

In accordance with one aspect of the present invention, there is provided a novel cross member for a truck tractor frame that comprises two substantially similar side members. The two identical parts are insertable between the side walls of two opposing C-shaped channels of a truck tractor frame. The side members interconnect with one another to define a rigid cross member that fits snugly between the side walls of two C-shaped beams. The interconnected cross member parts are bolted or otherwise secured to the C-shaped beams.

BRIEF DESCRIPTION OF THE DRAWINGS

The above-mentioned features of the invention will become more clearly understood from the following detailed description of the invention read together with the drawings in which.

DETAILED DESCRIPTION OF THE INVENTION

Figure 1:
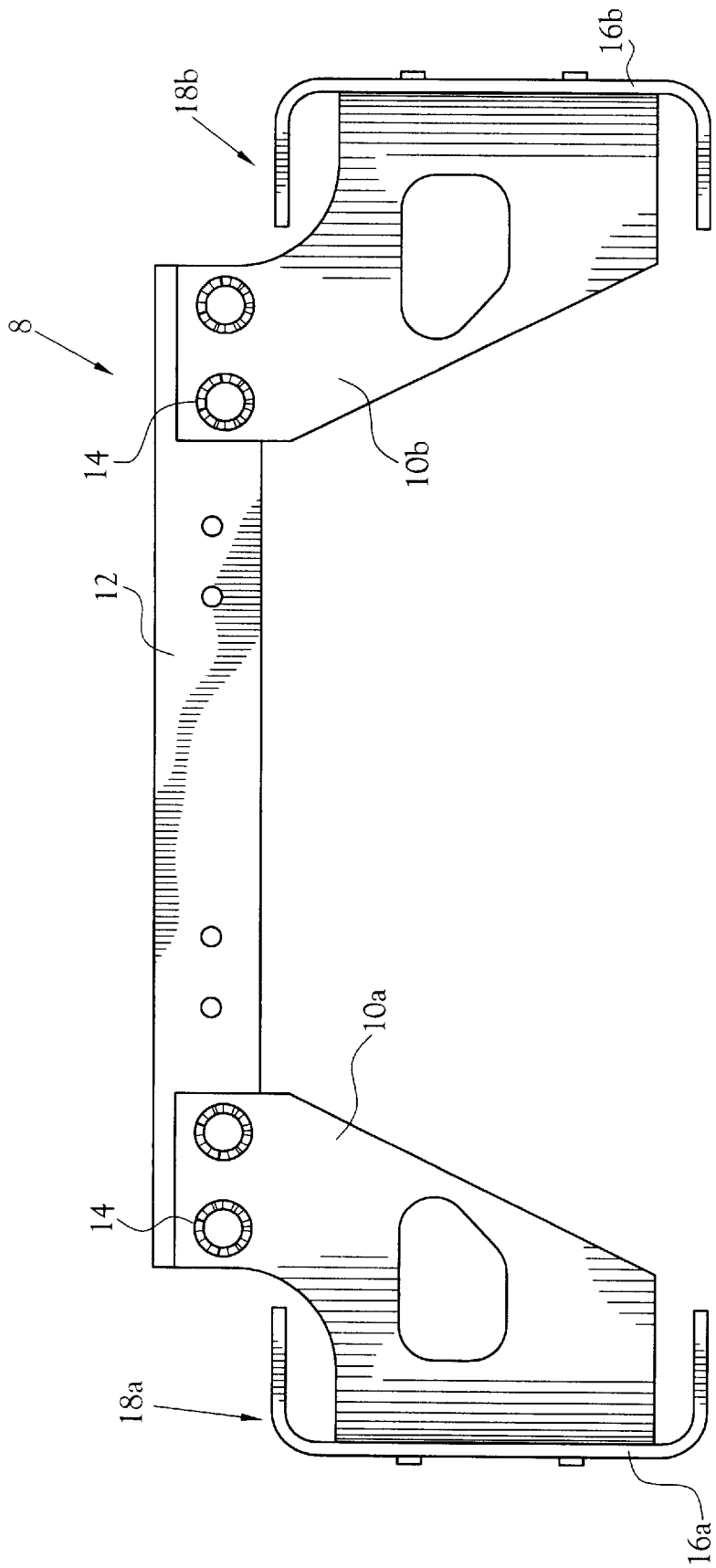
FIG. 1 is an elevation view a cross member of the prior art.

Referring now to the Figures in which like reference numerals indicate like or corresponding features, there is shown in FIG. 1 a prior art cross member 8 comprising two support members 10a and 10b and an elongated cross bar 12. Each of the support members 10a and 10b is bolted to an end of the cross bar 12 with a plurality of bolts 14. The support members 10a and 10b are adapted to be bolted to the respective side walls 16a and 16b of opposed channeled beams 18a and 18b of a truck tractor frame. The channeled beams 18a and 18b are in fixed positions relative to one another.

Figure 2:
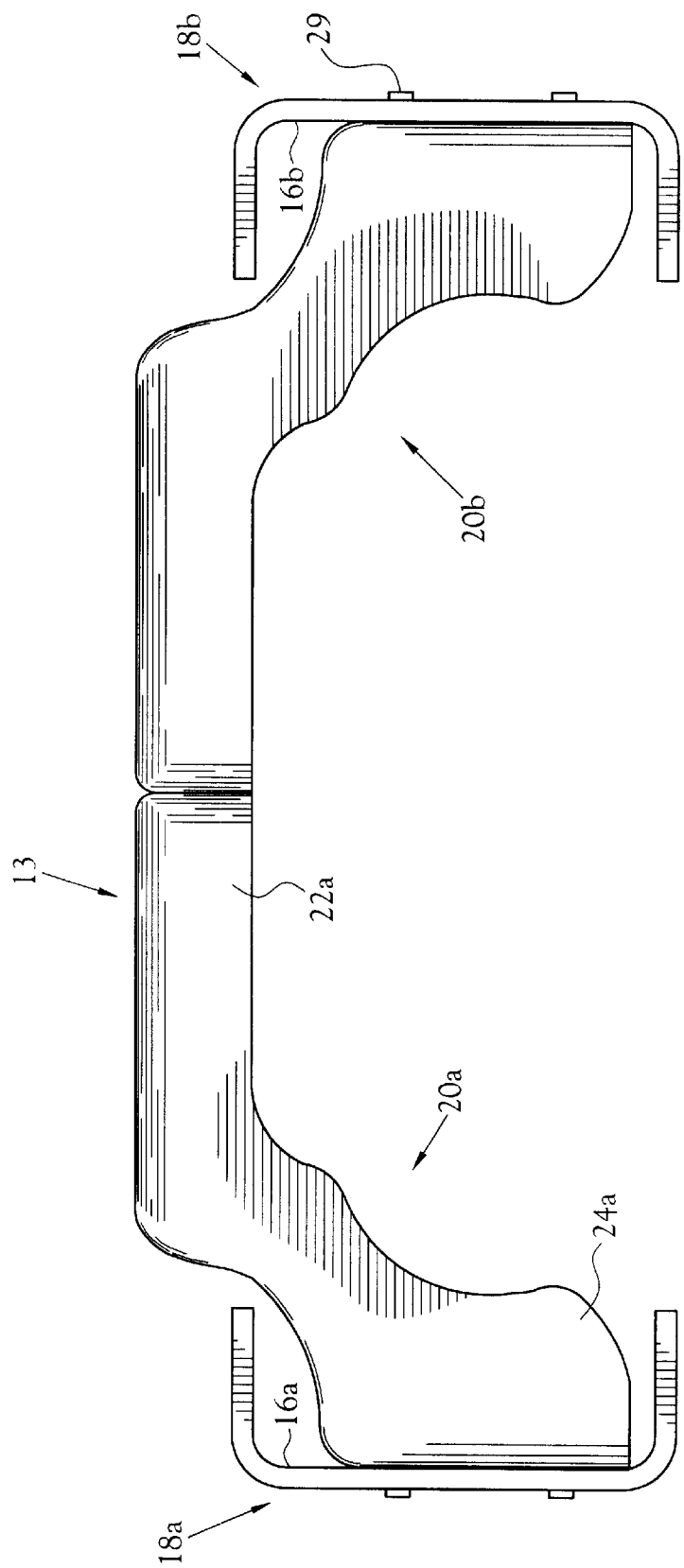
FIG. 2 is an elevation view of an assembled cross member embodying various features of the present invention.

In accordance with the present invention, as illustrated in FIG. 2, a cross member comprises two substantially similar, and preferably identical, elongated side members 20a and 20b. In the depicted embodiment, the side members 20a and 20b are identical. Accordingly, side member 20a will be described in detail and it will be recognized by those skilled in the art that side member 20b is identical.

Figure 3:
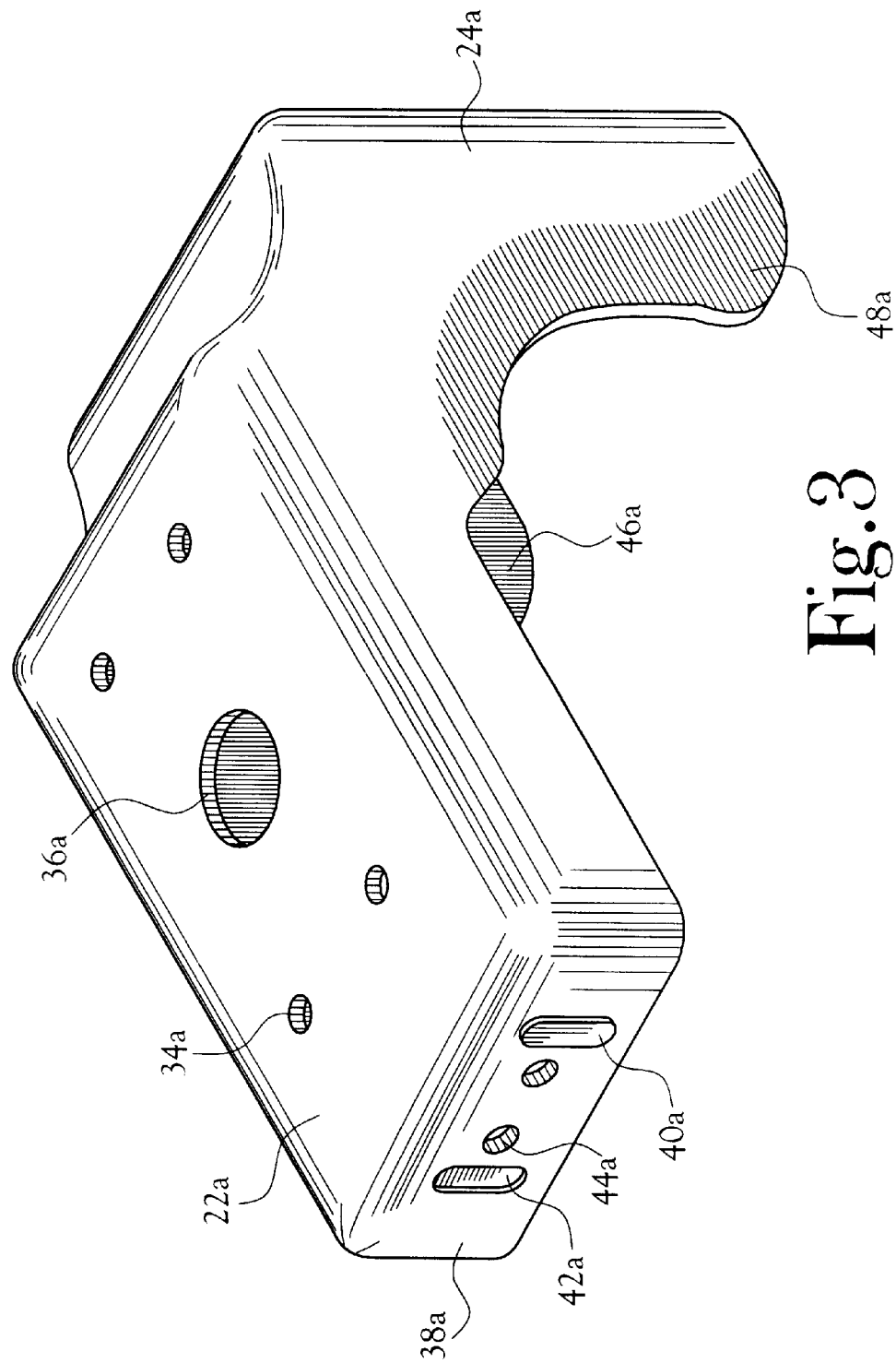
FIG. 3 is a perspective view of one member of a cross member embodying various features of the present invention.
Figure 4:
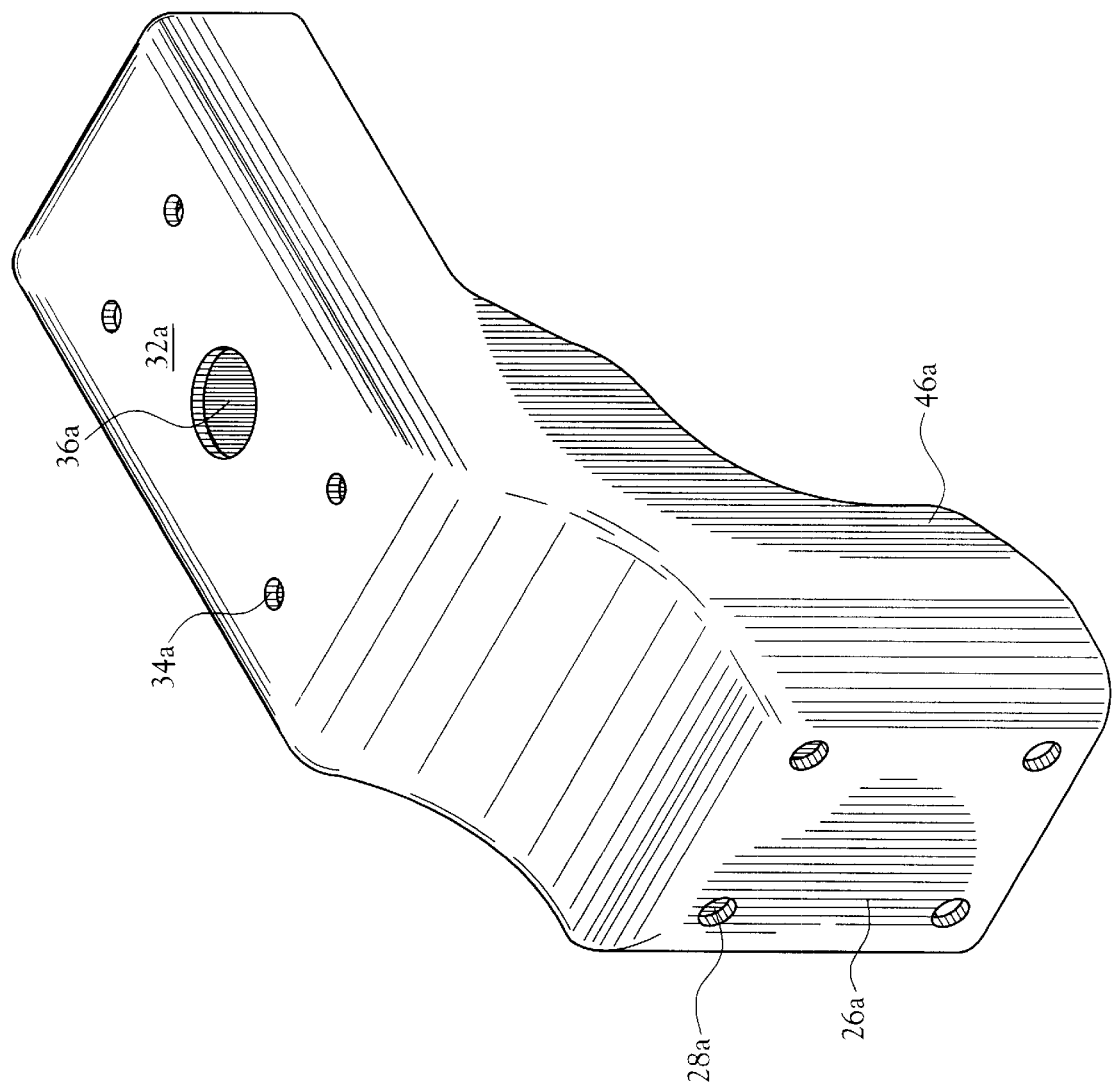
FIG. 4 is a perspective view of one member of a cross member embodying various features of the present invention.

Referring to FIG. 3 and FIG. 4, the side member 20a, comprising a rigid material such as steel, for example, is generally L-shaped in cross-section, defining an upper support leg 22a and a side leg 24a. The side leg 24a includes a generally planar securing end wall 26a that is oriented generally perpendicular to the longitudinal axis of the side member 20a. A plurality of apertures 28a are defined in the side wall 26a. The apertures 28a are arranged in a pattern identical to a pattern of apertures (not shown) defined in the side wall 16a of the channeled beam 18a. Each of the apertures 28a is sized to receive a bolt 29 for secure connection to the side wall 16a of the channeled beam 18a.

The upper support leg 22a includes a generally planar top surface 32a that is oriented generally parallel with the longitudinal axis of the side member 20a. The top surface 32a is adapted to support a cab or other equipment on the truck tractor frame. A plurality of apertures 34a are defined in the top surface 32a. The apertures 34a are arranged in a pattern identical to a pattern of apertures defined in the cab or other equipment being attached to the frame. Each of the apertures 34a is sized to receive a bolt (not shown) for secure connection of the cab or otter equipment to the side member 20a. An additional aperture 36a is provided to allow cables or hoses, for example, to be extended through the side member 20a.

Figure 5:
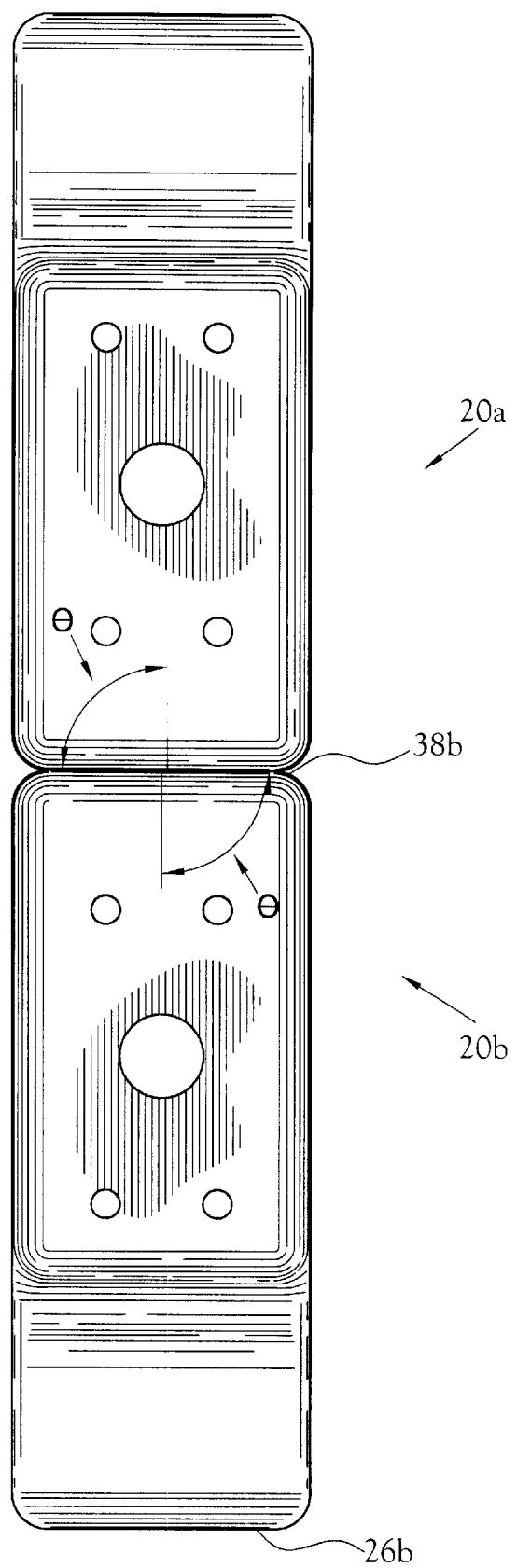
FIG. 5 is a plan view of an assembled cross member embodying various features of the present invention.

The upper support leg 22a includes a generally planar mating end wall 38a that is generally perpendicular to the top surface 32a, extending downwardly therefrom. The mating end wall 38a is oriented other than perpendicular to the longitudinal axis of the side member 20a. In the embodiment depicted in FIG. 5, the mating end wall defines an acute angle $\theta$, preferably of about 89 degrees, with respect to the longitudinal axis of the side member 20a.

A male connector 40a and a female connector 42a are defined in the mating end wall 38a. In the depicted embodiment, the male connector 40a comprises a convex projection and the female connector 42a comprises a concave depression. The male connector 40a and the female connector 42a are spaced apart from one another and equidistant from the vertical center line of the mating end wall 38a. It will be recognized by those skilled in the art that other mating connections may be provided within the spirit and scope of the present invention. A plurality of apertures 44a are defined in the mating end wall 38a. The apertures 44a are arranged in a pattern that is symmetrical with respect to the vertical center line of the mating end wall 38a.

Bracket walls 46a and 48a extend between the securing end wall 26a, the top surface 32a and the mating end wall 38a to provide reinforcement against flexing motion of the side member 20a.

As illustrated in FIG. 2, a cross member 13 is assembled between two channeled beams 18a and 18b that are in fixed, generally parallel positions relative to one another. The side member 20a is bolted to the side wall 16a of the channeled beam 18a by securing bolts 29 through the apertures 28a and apertures defined in the side wall 16a. Thereafter, the side member 20b is slid into position with the securing end wall 26b in contact with the side wall 16b of the channeled beam 18b. Initially, frictional contact between the male connectors 40a with the opposing mating end walls 38b and 38a, respectively, prevents alignment of the longitudinal axes of the side members 20a and 20b. However, the non-perpendicular relation of the mating end walls 38a and 38b relative to the respective longitudinal axes of the side members 20a and 20b, respectively, allow the male connectors 40a to pass one another. With a slight flexing of the mating end walls 38a and 38b, the male connectors 40a can move into mating engagement with the female connectors 42a, respectively, thus coaxially aligning the longitudinal axes of the side members 20a and 20b. At this point, the apertures 44a defined in the mating end wall 38a are aligned with apertures defined in the mating end wall 38b. Bolts are then secured through the apertures 44a, securely engaging the mating end walls 38a and 38b. Bolts 29 are also secured through apertures (not shown) defined in the side wall 16b, securing the side member 20b to the side wall 16b.

A cross member in accordance with the present invention can be assembled using just two identical side members and standard bolts. The costs of production and maintaining inventory are thus minimized.

Whereas the present invention has been described in specific terms for purposes of clarity and understanding, it will be recognized by one skilled in the art that various modifications and/or alternatives may be employed without departing from the substance of the invention. It is intended, therefore, that the present invention be limited only as set forth in the claims appended hereto.

We claim:

1. A cross member for mounting between a first channeled beam and an opposed second channeled beam located in a fixed position relative to said first channeled beam comprising:

two substantially similar elongated side members, each of said side members including a secured end wall and an opposed mating end wall, said secured end wall defining apertures adapted to align with apertures defined in one of the channeled beams and said mating end wall defining a surface that defines an acute angle with respect to the longitudinal axis of said side member.

2. The cross member of claim 1 wherein said mating end wall of each said side member further defines a male connector and a female connector, said male connector of each said side member being adapted to matingly engage said female connector.

3. The cross member of claim 2 wherein said male connector comprises a convex projection and said female connector comprises a concave depression.

4. The cross member of claim 1 wherein said mating end wall defines an angle of about 89 degrees with said longitudinal axis of said side member.

* * * * *